(12) United States Patent
Pieralisi (10) Patent No.: US 9,439,338 B2
(45) Date of Patent: Sep. 13, 2016

(54) PLOW

(71) Applicant: AIRIS SOCIETA' A RESPONSABILITA' LIMITATA, Milan (IT)

(72) Inventor: Gennaro Pieralisi, Jesi (IT)

(73) Assignee: AIRIS SOCIETA' A RESPONSABILITA'LIMITATA, Milan (IT)

( * ) Notice: Subject to any disclaimer, the term of this patent is extended or adjusted under 35 U.S.C. 154(b) by 0 days.

(21) Appl. No.: 14/426,613

(22) PCT Filed: Sep. 26, 2013

(86) PCT No.: PCT/EP2013/070113
§ 371 (c)(1),
(2) Date: Mar. 6, 2015

(87) PCT Pub. No.: WO2014/049075
PCT Pub. Date: Apr. 3, 2014

(65) Prior Publication Data
US 2015/0257328 A1    Sep. 17, 2015

(30) Foreign Application Priority Data

Sep. 27, 2012 (IT) .............................. AN2012A0120

(51) Int. Cl.
*E02F 3/36* (2006.01)
*A01B 11/00* (2006.01)
*E02F 3/815* (2006.01)

(52) U.S. Cl.
CPC ............... *A01B 11/00* (2013.01); *E02F 3/815* (2013.01)

(58) Field of Classification Search
CPC .... A01B 17/00; A01B 11/00; A01B 49/065; A01B 73/00; A01B 79/005; A01B 63/023; B62D 49/08; E02F 3/961; E02F 5/102; E02F 5/003; E02F 5/027; E02F 5/145; E02F 3/815; E02F 3/8155; E02F 3/966; E02F 3/405; E02F 5/326; E02F 9/221; E02F 9/2271; E02F 9/2267
USPC ........ 172/2–4.5, 10, 40, 102, 606, 699, 811, 172/816; 405/175, 180, 184.1; 37/347, 348, 37/447
See application file for complete search history.

(56) References Cited

U.S. PATENT DOCUMENTS 2,641,173 A * 6/1953 Rhoten .................. A01B 17/00
172/40
3,627,056 A * 12/1971 Rogers .................. A01B 11/00
172/10

(Continued)

FOREIGN PATENT DOCUMENTS

DE    1557822 A1    10/1970
DE    2604415 A1    8/1977

(Continued)

OTHER PUBLICATIONS

International Search Report for corresponding International Application No. PCT/EP2013/070113.

*Primary Examiner* — Robert Pezzuto
(74) *Attorney, Agent, or Firm* — Egbert Law Offices, PLLC (57) ABSTRACT

A plow apparatus has a share to cut soil into clods, a moldboard connected to the share to turn over the clods, a beam connecting the moldboard to a motor vehicle, a vibrator assembly connected to the moldboard so as to vibrate the moldboard, a force sensor connected to the beam so as to detect a plowing force, and a controller connected to the force sensor and the vibrator assembly so as to control a vibration of the vibrator assembly according to a force value detected by the force sensor.

10 Claims, 6 Drawing Sheets

(56) References Cited

U.S. PATENT DOCUMENTS 3,905,200 A * 9/1975 Ylinen .................... H02G 1/06
  37/370
4,667,744 A * 5/1987 Kauss .................. B62D 49/08
  172/2
9,022,690 B2 * 5/2015 Trottier .................. E02F 3/961
  405/184.1

FOREIGN PATENT DOCUMENTS

| | | |
|---|---|---|
| DE | 3319531 A1 | 11/1984 |
| EP | 1108349 A1 | 6/2001 |
| FR | 2517505 A1 | 6/1983 |
| GB | 519046 A | 3/1940 |
| WO | 03024193 A1 | 3/2003 |

* cited by examiner

PLOW

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to an improved plow.

2. Description of Related Art Including Information Disclosed Under 37 CFR 1.97 and 37 CFR 1.98

Plows have been used in agriculture since the earliest times to move the soil and prepare it for additional works or directly for sowing.

Historically speaking, the plow is a sort of evolution of the pick. In the past it was pulled by oxen or people. Today, in modernized countries, it is pulled by mechanical tractors.

Traction is mechanical in countries with mechanized agriculture, and plows are mounted on tractors and fixed to a hauling hook, resting on wheels (so-called hauled plows). Alternatively, being always hauled by the tractor, plows are fixed to a hydraulic power lift (so-called carried plows that project from the tractor without the support of wheels). Carried plows are mostly used in ordinary work because they make road transfers easier.

The current models of plows can be grouped in different categories according to the type of system used for attachment to the motor vehicle (hauled plows, semi-carried plows and carried plows), the type of tool (fixed single or multiple tool and idle tool) and the type of adjustment and control system of the working parts (tools) installed on each type of plow.

All types of plow are provided with some common parts that can be divided into three categories according to their function: working tools, such as coulter (or knife), chisel, share and moldboard; connection, support and guide devices, such as beam, horizontal bar; and adjustment devices to control the burying and filling operations of the working tools and adjust the working depth and width.

Figure 1:
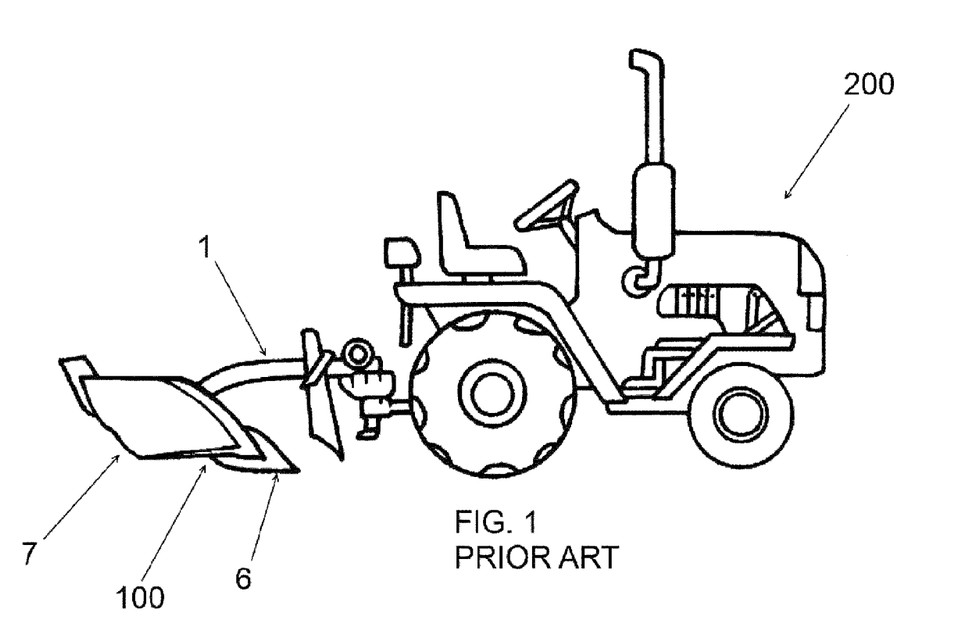
FIG. 1 is a side view of a plow according to the prior art, mounted on a tractor.

FIG. 1 shows a traditional plow according to the prior art, which is generally indicated with reference number (100), mounted on a motor vehicle, specifically a tractor in FIG. 1, indicated with reference number (200).

Figure 2:
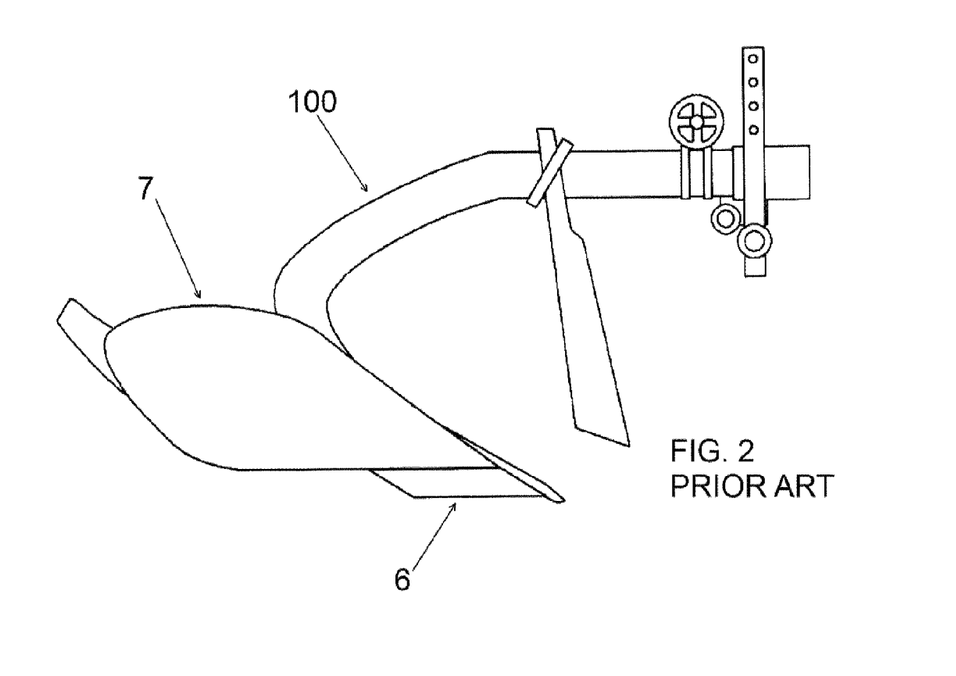
FIG. 2 is an enlarged view of the plow according to the prior art shown in FIG. 1.

FIG. 2 is an enlarged view of the traditional plow according to the prior art shown in FIG. 1.

The plow (100) according to the prior art comprises:
a share (6) used to cut the soil,
a moldboard (7) connected to the share (6) used to turn over the clods of soil cut by the share,
a beam (1) connecting the share-moldboard assembly to a motor vehicle (200).

On the whole, the beam (1) supports the entire ploughing effort exerted through the various tools used to work the soil (6) are the most worn-out parts.

The plow (100) is completed by adjustment devices (3) that control the burying and digging operations of the beam together with all working tools, and adjust the depth and width of the furrows.

In spite of being a diffused practice, ploughing is impaired by several drawbacks.

Ploughing with a plow of the prior art is a very expensive operation in terms of energy, with consequent high fuel consumption for the motor vehicle. Moreover, ploughing according to the prior art leaves macro clods on the surface of the soil because of the poor definition of the furrow made in the soil by the working parts of the plow as consequence of the cuts. Therefore, it is often necessary to carry out preparation works of the seed bed, thus extending the time needed for sowing, making it difficult to rotate crops, involving higher fuel costs and worsening the structure of the soil due to the repeated travels of the plow.

The use of a vibrator applied to the plow is known in order to solve, at least partially, the aforementioned drawbacks.

The use of vibrators with connecting rod-crank system with predefined travel is known.

EP1108349 discloses actuating means comprising an eccentric-connecting rod transmission connected to the frame (beam) of the plow. The connecting rod is connected to the blade of the plow by means of rods. The blade is mounted in a grooved guide of the moldboard in such manner to slide. In this way, the blade of the moldboard makes an alternate movement with about 7-8 mm travel with frequency (vibrations) in the range of 500-1200 per minute. The blade of the moldboard is connected to the frame of the plow by means of the connecting rod and levers. Consequently the travel of the blade is fixed and cannot be adjusted during ploughing.

DE1557822 discloses a vibrator comprising a statically balanced eccentric disk, instead of an eccentric mass that transmits vibrations. As a matter of fact, said vibrator transmits oscillations just like a crank (eccentric) and a connecting rod. The size of the oscillations depends on the double of the eccentricity value of the eccentric, which guarantees the oscillation around the fulcrum of the mobile system.

Consequently, the type of plow disclosed in EP1108349 and DE1557822 may be subject to jamming in case of obstacles, such as stones or harder materials.

Vibrators with eccentric masses are known to solve these drawbacks at least partially.

DE2604415 discloses a vibrator disposed on a support in the proximity of the share of the plow and elastic means to dampen the vibration and prevent it from propagating to the frame of the tractor.

GB519046 discloses a moldboard connected to the frame of the plow with resilient means (elastic supports). An eccentric shaft is directly connected to the structure of the moldboard. The eccentric shaft is actuated by a pulley driven by a belt in such manner to put the moldboard in high-frequency vibration. The eccentric shaft can be actuated by an electric motor or by the tractor and can provide vibrations in the ultrasound range.

Although they do not have a fixed travel, the vibrators with eccentric masses disclosed in DE2604415 and GB519046 are impaired by the fact that they work at a predefined excitation force that cannot be varied during the operation of the plow according to the type of worked soil.

The purpose of the present invention is to eliminate the drawbacks of the prior art and, particularly, reduce fuel costs, being ploughing one of the most energy-consuming activities.

Another purpose of the present invention is to obtain a better crumbling of clods, as well as better defined furrows, thus making it easier to prepare the seed bed.

BRIEF SUMMARY OF THE INVENTION

The plow of the invention is characterized by the fact that it comprises at least one vibrator.

The plow comprises a beam and a moldboard fixed to said beam. The moldboard comprises a front concave surface faced towards the motor vehicle and a back surface faced towards the opposite direction with respect to the front concave surface. The moldboard comprises an upper edge and a lower edge.

The vibrator comprises an upper end and a lower end and is fixed on the back surface of the moldboard.

The plow comprises a share disposed in front of said moldboard and used to make a horizontal cut in the soil because of the forward movement of the plow, thus allowing the moldboard to lift up and turn over a strip of soil. Therefore the share must penetrate deeply in the soil, overcoming the friction force exerted by the soil.

In order to favor the penetration of the assembly in the soil and the turning over of the soil on the moldboard, said vibrator is advantageously disposed on the back surface of the moldboard, in the proximity of the lower edge, in order to reduce the friction caused by the contact between of the soil and the plow and, in particular, the moldboard that remains in contact with the soil longer.

Evidently, the parts of the plow that must be put into vibration are the share and moldboard. Given the fact that the vibrator must remain out of the soil, in order not to interfere with the worked soil, the shorter the distance between the vibrator and the share of the plow, the more effective vibrations will be, in view of the lower dampening of the vibrations transmitted by the vibrator to said share.

Moreover, a higher intensity of the vibrations transmitted by the vibrator to the share and to the moldboard of the plow corresponds to a dampened friction effect of the soil detached from the land being ploughed.

It must be noted that a proper frequency of the vibrations contributes to reduce energy waste and fuel consumption according to the type of plow and soil.

Therefore, the plow of the invention makes it possible to overcome the drawbacks of the prior art, obtaining better defined furrows and deeper penetration of the share, at the same energy level, as well as a better breaking of clods.

Evidently, the lower the friction to be overcome by the share moldboard assembly of the plow in order to penetrate, cut, lift and turn over the soil, the lower the energy required by the plow for ploughing will be. The use of the vibrator reduces fuel consumption of the tractor during ploughing by 10-30% according to the conditions and type of the soil.

BRIEF DESCRIPTION OF THE DRAWINGS

For explanatory reasons, the description of the improved plow according to the present invention continues with reference to the attached drawings, which only have illustrative, not limiting value, wherein.

DETAILED DESCRIPTION OF THE INVENTION

Figure 3:
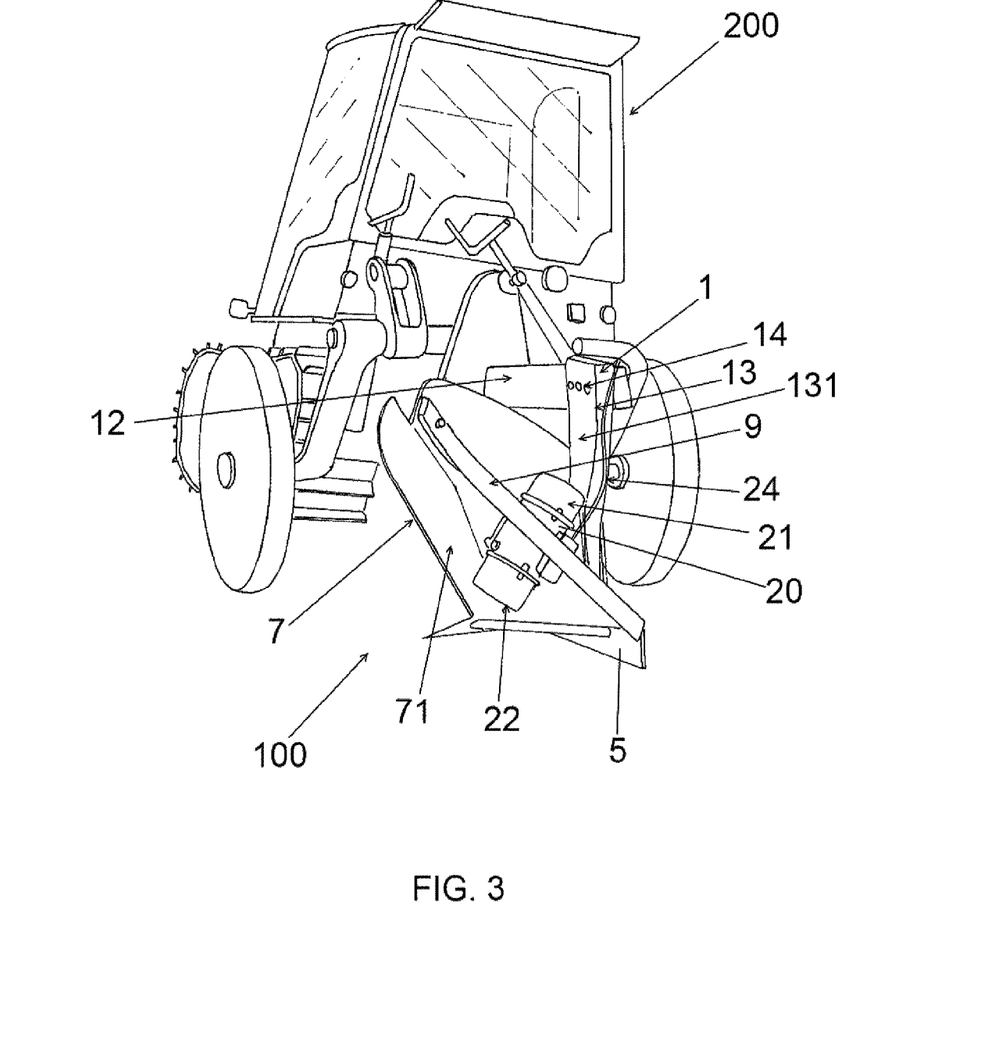
FIG. 3 is a back perspective view of a tractor and a plow according to the present invention.

FIG. 3 shows a plow (100) according to the present invention connected to a motor vehicle (200).

Figure 4:
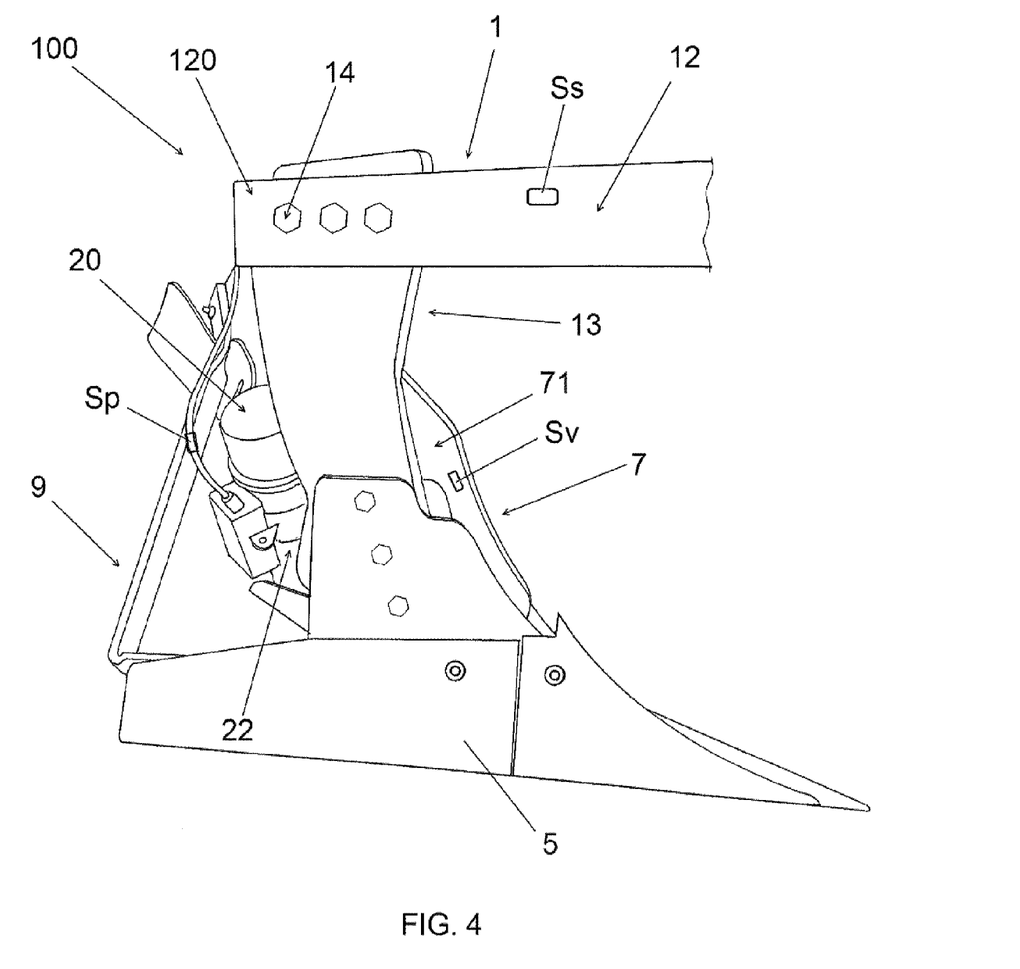
FIG. 4 is a side view of the plow according to the present invention from the opposite side compared to FIG. 3.
Figure 5:
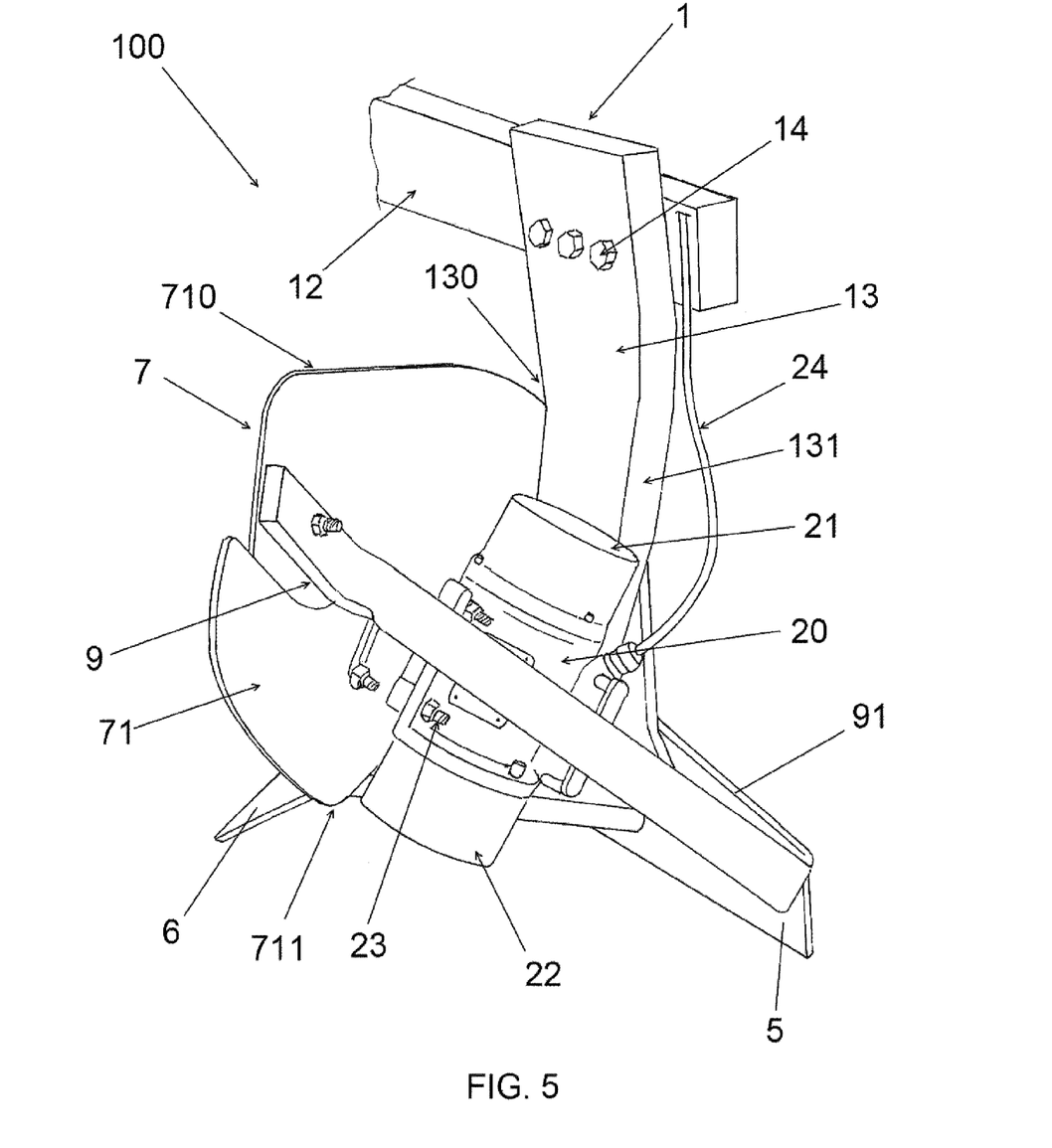
FIG. 5 is an axonometric view of the plow according to the present invention.

Also referring to FIGS. 4 and 5, the plow (100) comprises a beam (1), a share (6), a chisel (5) and a moldboard (7). Although it is not shown in the attached figures, the plow of the invention may also comprise a coulter connected to the beam or directly to the chisel.

The beam (1) comprises a horizontal part (12) and a vertical part (13). The horizontal part (12) of the beam (1) is provided with a free end (120) whereon the vertical part (13) of the beam (1) is fixed with bolts (14).

The vertical part (13) of the beam (1) comprises a front side (130) facing towards the forward traveling direction of the plow (100) and a back side (131) facing towards the opposite direction with respect to the forward traveling direction of the plow (100).

The moldboard (7) of the plow is fixed in correspondence of and onto said front side (130) of the vertical part (13) of the beam.

The moldboard (7) is basically made of sheet steel and composed of a front concave surface facing towards the forward traveling direction of the plow, and a back surface (71) opposite the front concave surface. The moldboard (7) is fixed to the vertical part (13) of the beam and the back surface (71) of the moldboard is in contact with the front side (130) of the vertical part (13) of the beam.

The moldboard (7) comprises an upper edge (710) and a lower edge (711).

A tilted bar (9) connects the moldboard (7) to a horizontal bar (91). The horizontal bar (91) is made of a planar metal sheet with vertical working side directed towards the forward traveling direction of the plow and lower corner in parallel position to the soil direction. The horizontal bar (91) is in continuity with the chisel (5), which is in turn in continuity with the share (6). When seen from above, the share (6) and horizontal bar (91) form a penetration angle in the soil.

The vertical wall of the horizontal bar (91) is adapted to rest against the vertical wall of the furrow as soon as it is made by the coulter and the chisel (5) along the forward movement direction of the plow and it is being formed because of the action of share (6) and moldboard (7). Therefore, the horizontal bar (91) is especially adapted to act as guide and support for the entire plow on the unploughed soil for a substantially rectilinear direction of the furrow.

The shape of the plow is merely indicative, the range of known plows being very large. The application of a vibrator to the plow, in order to increase its ploughing efficiency, determines some changes in the plow configuration according to the specific type of plow.

Therefore, the tilted bar (9) acts as reinforcement and connection between moldboard (7) and horizontal bar (91).

Referring to FIG. 5, the share (6) precedes the moldboard (7), in terms of contact with soil, with oblique transversal position compared to the forward direction of the plow (100).

Referring to FIGS. 4 and 5, the plow (100) comprises a vibrator (20).

The vibrator (20) is mechanized and comprises a motor with shaft whereon eccentric masses are keyed.

The rotation of the eccentric masses of the vibrator (20) generates vibrations. The variable frequency of the vibrations is adjusted, according to plow type and soil conditions, by varying the rotational speed of the drive shaft, whereas the intensity of the vibrations is defined by the eccentricity and weight of the eccentric masses.

Advantageously, the frequency of the vibrations generated by said vibrator (20) mounted on the plow (100) is 1000-3000 vibrations/min, preferably 2000 vibrations/min. The power of the vibrator (20) depends on the size of the plow (100) and is 0.3-2.0 kW, preferably 0.5 kW.

The use of the vibrator (20), mounted on the plow (100) and vibrating at the frequency of 2000 vibrations/min, allows for saving 10-30% of the power needed by the plow (100) to plough and consequently for saving 10-30% of the fuel used by the tractor during ploughing.

The vibrator (20) mounted on the plow (100), comprises an upper end (21) and a lower end (22). The vibrator (20) is fixed with bolts (23) to the back surface (71) of the moldboard (7) of the plow (100). In particular, the vibrator (20) is fixed to the back surface (71) of the moldboard in such manner to be disposed in the lowest point of the back surface (71) of the moldboard.

Moreover, the vibrator (2) is disposed in the space between the tilted bar (9) and the horizontal bar (91) of the moldboard (7).

In order for the vibration transmitted by the vibrator (20) to the moldboard (7) to be effective, the vibration direction of the moldboard (7) must be substantially perpendicular to the working surface of the moldboard. Moreover, the vibrations of the vibrator (20) must be "felt" more in the area of the moldboard that is mostly involved in the turning over of the soil.

The position of the vibrator (20) on the plow (100) is strictly related to the efficacy of the vibrations transmitted to said share (6) and moldboard (7) of the plow (100).

In particular, if the vibrator (20) is mounted on the plow (100) in such manner that the lower end (22) of the vibrator (20) is as close as possible to the lower edge (711) of the back surface (71) of the moldboard (7), said vibrator (20) is disposed at a short distance from the share (6) of the plow (100) and, therefore, the vibrations generated by the vibrator (20) and transmitted to said share (6) are not very dampened.

Referring to FIG. 3, the plow (100) is mounted on a tractor, generally indicated with reference number (200).

The vibrator (20) mounted on the plow (100) comprises a cable or power supply pipe (24) adapted to power said vibrator (20). The powering of the vibrator (20) can either be hydraulic or pneumatic or electrical, according to the type of power used for the tractor (200) whereon the plow (100) is fixed.

In particular, if the vibrator (20) is hydraulically powered, the vibrator (20) has a hydraulic motor and a hydraulic pump actuated by an internal combustion engine of the tractor (200) to power said hydraulic motor by means of a pump with fixed or variable displacement. Vice versa, if the vibrator (20) is electrically powered, the vibrator (20) is powered with direct current by connecting said power supply cable (24) to a battery provided on the tractor (200).

The vibrator (20) can be also powered with alternate current. In such a case, an electrical generator directly actuated by the motor of the tractor (or by an optional internal combustion engine) is provided.

Alternative embodiments of the plows according to the invention provide for the presence of two or more vibrators, which actuate differently on the various parts of the plow (share, moldboard and other parts).

Figure 6:
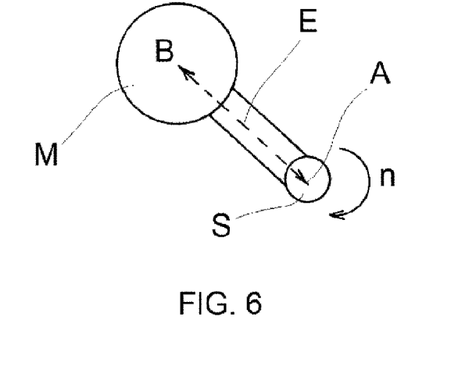
FIG. 6 is a diagrammatic view of a generic vibrator.

Referring to FIG. 6, a generic vibrator can be represented with only one equivalent mass (M) (also with multiple masses), connected to a rotary shaft (A) driven into rotation by a motor around its axis at a rotational speed (n). The mass (M) has an eccentric center of gravity (B) with respect to the axis of rotation (A) of the rotary shaft with eccentricity value (E).

The mass (M) is expressed in kilograms, the rotational speed (n) in revolutions per minute (rpm) and eccentricity (E) in meters.

The characteristics of the vibrator are:

$$f \text{(Hertz)} = n/60 \text{ (excitation frequency)}$$

$$F(N) = M \cdot 4(\pi f)^2 \cdot E \text{ (centrifugal excitation force)}$$

Figure 7:
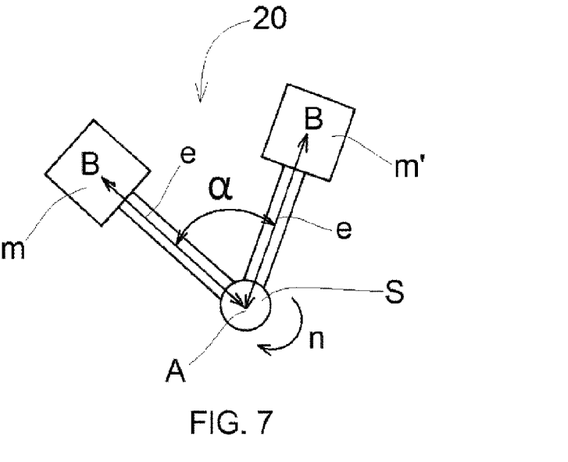
FIG. 7 is a diagrammatic view of a traditional vibrator.

FIG. 7 shows a vibrator (20) of traditional type comprising two masses (m, m') with the same mass and positioned with the same eccentricity (e) with respect to the axis (A) of the rotary shaft (S). The masses (m, m') are joined to the rotary shaft (S), but angularly displaced by an angle ($\alpha$), meaning that the two straight lines passing through the centers of gravity of the two masses and the axis of the rotary shaft form an angle ($\alpha$).

Therefore, with such vibrator (20) provided with two masses, it is theoretically possible to vary the mutual angular position of the two masses (m, m'), i.e. the angle ($\alpha$), in such manner to vary the vectorial resultant of the equivalent centrifugal force F ed, in scalar terms, the product "M*E" that represents the excitation force F of the vibrator. When the two masses (m, m') are in opposition (at 180°), the excitation force F is null (total eccentricity E=0). When the two masses (m, m') are in phase (at 0°), the excitation F is maximum (resultant for an equivalent mass M=2 m positioned with eccentricity E=e).

However, in the traditional vibrator (20) of FIG. 7, the two masses (m, m') can be displaced only with a manual action on the vibrator, after stopping and partially dismounting it. Therefore, the vibration of the traditional vibrator (20) can be controlled only by controlling the rotational speed (n) of the rotary shaft.

The excitation frequency (f) can be varied on any traditional vibrator of traditional type.

In case of hydraulic vibrator (actuated by a hydraulic motor, through a pump directly moved by a power take-off of the tractor), the vibration frequency, which is strictly connected to the rotational speed of the vibrator, is varied by changing the hydraulic capacity of the hydraulic motor. This can be done by intervening on the working condition of the pump, in case of a variable displacement pump, or of the hydraulic motor, if with variable displacement.

In case of an electrical vibrator (actuated by an electric motor), it is necessary to act on the electrical power supply produced by an alternator. An electrical frequency converter must be disposed between alternator and electrical motor (inverter). So, by varying the electrical frequency, the rotational speed "n" of the vibrator, and consequently the excitation frequency "f" of the vibrator, is varied.

Innovative vibrators have been designed in order to vary the excitation force (F), as illustrated below.

Figure 8:
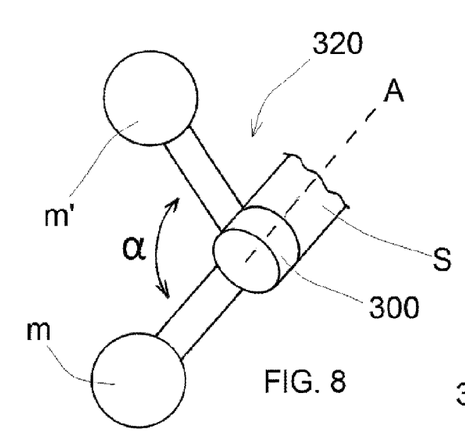
FIG. 8 is a diagrammatic view of an innovative vibrator.

FIG. 8 shows a vibrator (320) wherein a first mass (m) is fixed to the rotary shaft (S) and a second mass (m') is revolvingly mounted with respect to the rotary shaft, in such manner to vary the angular distance of the two masses (m, m'), i.e. the angle ($\alpha$) between the radial straight lines that connect the center of gravity of the two masses (m, m') to the axis (A) of the rotary shaft. The vibrator (320) comprises an adjustment system (300) adapted to vary the angular position "$\alpha$" of the two masses (m, m'). The adjustment device (300) makes the second mass (s) rotate with respect to the shaft (S) of the vibrator in such manner to obtain the desired angular position. Moreover, it blocks the second mass (m') in the desire angular position during the rotation of the shaft (S) of the vibrator.

In view of the above, the excitation force "F" can be varied from a null minimum value to a maximum value by means of the adjustment system (300).

An embodiment of the adjustment system (300) can comprise a back driven motor installed on board the vibrator, such as a brushless motor and a planetary reduction gear, if any, to impress the desired mutual displacement between the two masses (m, m'). In this way the vibrator (320) can be automatically adjusted during its operation without being dismounted.

Figure 9:
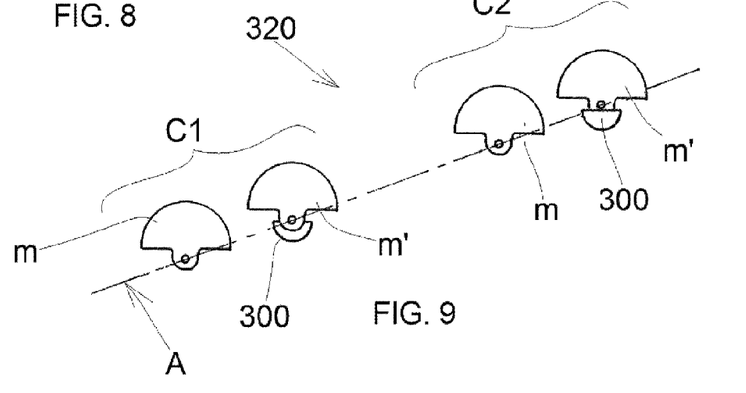
FIG. 9 is a diagrammatic view of a different version of the vibrator of FIG. 8.

FIG. 9 shows an alternative embodiment wherein the vibrator (320) comprises four eccentric masses (m, m') disposed in pairs (C1, C2) on the same drive shaft with axis of rotation (A). Each pair of masses comprises a first mass (m) fixed to the drive shaft and a second mass (m') that revolves with respect to the drive shaft in such manner to vary the angle ($\alpha$) between the two masses. The second mass (m') of each pair of masses is connected to an adjustment system (300).

Figure 10:
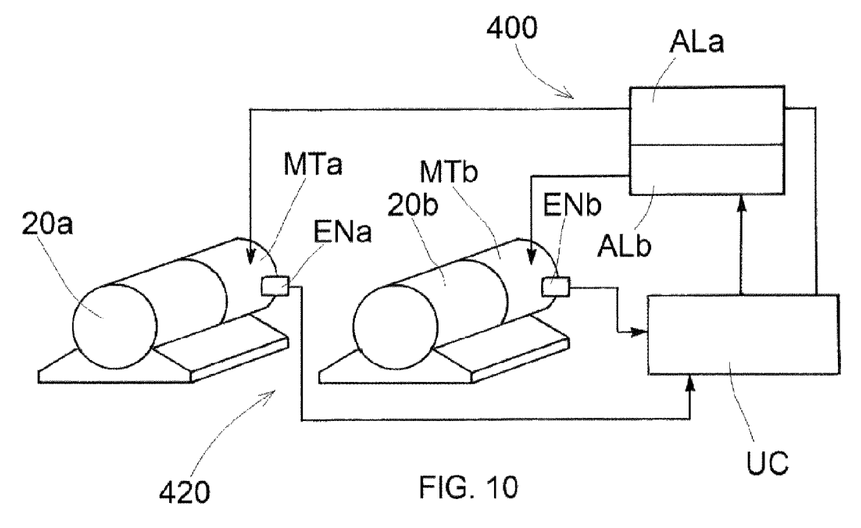
FIG. 10 is a diagrammatic view of an innovative vibration assembly.

Referring to FIG. 10, instead of using a single vibrator with one of the two masses in variable angular position during motion, a vibrating assembly (420) can be adopted, comprising two vibrators (20a, 20b) of traditional type (i.e. with non-variable angular position of the masses during motion). In such a case, an adjustment and control system must be provided (400) to adjust and control the rotational speed of the vibrator shafts and the mutual displacement of the masses of the two vibrators, in such manner to vary the mutual displacement of the masses and maintain the same rotational speed of the shafts of the two vibrators.

In this way the assembly of the two traditional vibrators (20a, 20b), and the adjustment and control system (400), must be considered as a vibration system with variable angular position of the masses of the two vibrators (20a, 20b), with vibrators in motion.

In this case, each vibrator (20a, 20b) is actuated by a motor (Mta, MTb). The two motors (MTa, MTb) are analogous and provided with position sensor (encoder) (ENa, ENb) to detect the position of the masses. The encoder can be external or internal to the motor. Each motor is provided with power supply (ALa, ALb), generally in alternate current, managed by a control unit (UC) based on the data detected by the encoders (ENa, ENb). Therefore, the adjustment and control system (400) comprises encoders (ENa, ENb), power supplies (ALa, ALb) and control unit (UC).

Motor (MTa) is the primary or master motor and the other motor (MTb) is the secondary or slave motor. The coordination between master and slave is made by the control unit (UC) that can be a dedicated (embedded) controller and a PLC (programmable) controller. The motors (MTa, MTb) can be of different type with respect to the brushless motor (with embedded encoder) or of any other type of induction motor (asynchronous, step-to-step or permanent magnets).

The adjustment and control system (400) provide the rotation of the rotary shafts of the vibrators (20a, 20b) in the same direction to have omnidirectional vibration or in the opposite direction to have unidirectional vibration. In fact, according to the soil configuration, a unidirectional vibration of the share-moldboard assembly may give better results in terms of ploughing efficiency and energy saving. Moreover, the direction of the unidirectional vibration and the scalar value of the excitation force (related to the direction) can be adjusted according to the displacement imposed to the masses of the two vibrators.

Therefore, a two-step action can be made on the individual vibrator (320) that comprises at least two masses (m, m') with adjustable position during motion, or on the vibrator assembly (420) that comprises two vibrators (20a, 20b) provided with adjustment and control system (400):

1. action on the number of revolutions (n) (of the individual or double vibrator) that involves the variation of the excitation frequency (f) and consequently also of the excitation force (F);
2. action on the angular position between two masses of the individual or double vibrator, with consequent variation of the excitation force (F).

The first or the second action can be applied independently, or a double action can be made in cascade mode—first and second action—in order to have a summation effect, should the first action not be sufficient.

Figure 11:
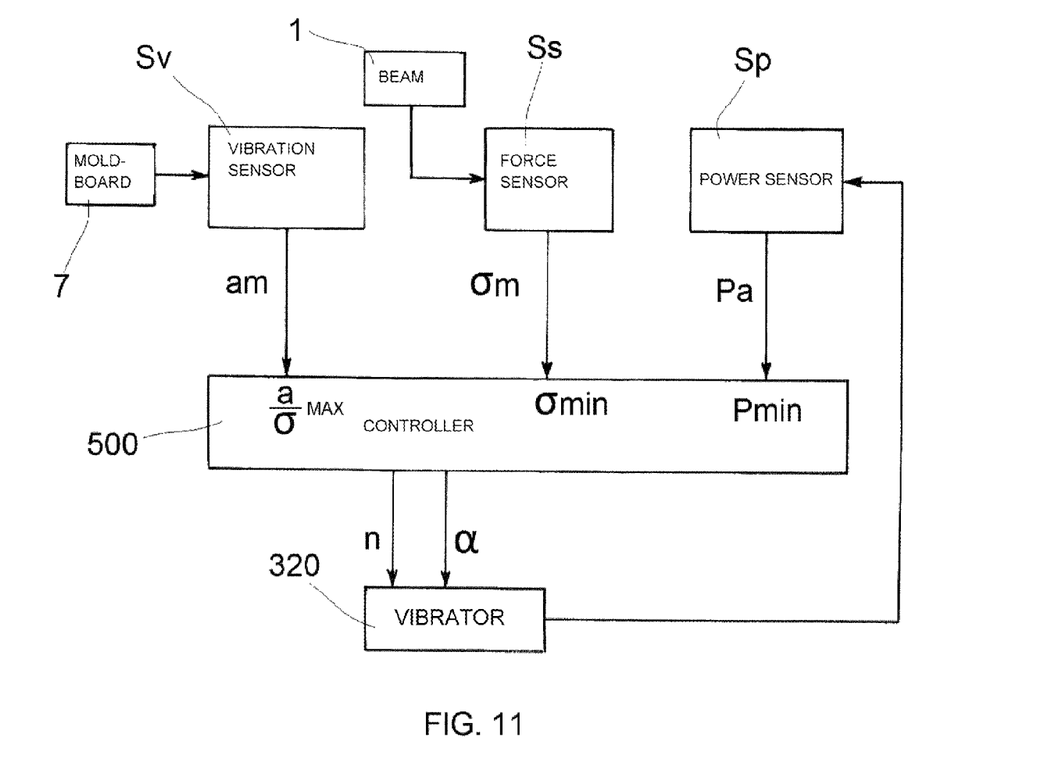
FIG. 11 is a block diagram of an automatic vibration system according to the present invention.

As shown in FIG. 11, the tractor of the invention comprises a controller (500) to provide automatic control of the vibrator assembly (20; 320; 420). FIG. 11 shows the vibrator (320), it being understood that any type of vibrator can be used.

The controller (500) is an electronic device, for example of PID (Proportional-Integral-Derivative) type, provided with dedicated software, and in part parameterization, for the specific application. The control logics can be of Fuzzy Logic type, as an alternative to PID.

The purpose of the automatic control is to obtain the most effective vibration result (effect of the vibrating excitation) on the share-moldboard assembly of the plow, in order to obtain energy saving during ploughing, with minimum tractive force for the plow.

Therefore sensors must be provided, and signals must be sent to the input of the controller (500). Based on the input signals, the controller processes an output signal to be sent to the vibrator (320) in order to vary the number of revolutions (n) and/or the angle ($\alpha$) between the masses (m, m') of the vibrator.

Referring to FIGS. 4 and 11, the tractor must comprise a force sensor ($S_S$), such as a strain gauge, applied to the beam (1) of the plow to detect the average value "$\sigma_m$" of the ploughing force. As mentioned, the ploughing force depends on various ploughing parameters, including ground conditions and soil resistance.

The optimization of the results obtained by the control system is based on the ideal vibration value to obtain the minimum ploughing effort and consequently achieve the energy saving provided by the application of the vibrator (320) on the plow (100).

Therefore the controller (500) acquires the force values ($\sigma_m$), pursuing a minimum force ($\sigma_{min}$). The minimum force ($\sigma_{min}$) is pursued by acting on the vibrator assembly (either individual or double), that is to say on the number of revolutions (n) of the vibrator and/or the angle ($\alpha$) between the masses of the vibrator.

Optionally, the plow comprises a power sensor (Sp), such as a wattmeter (in case of electrical vibrator) or another type of sensor (in case of hydraulic or pneumatic vibrator), connected to the vibrator (320) to detect the power absorption (Pa) of the vibrator (320). In such a case, the controller (500) also acquires the power absorption values (Pa), pursuing the maximum desired value $(P/\sigma)_{max}$ of the ratio between the power absorbed by the vibrator and the force on the beam.

Optionally, the plow also comprises a vibration sensor (Sv), such as an accelerometer, applied to the share (5)—moldboard (7) assembly to detect an average vibration value ($a_m$). Advantageously, the vibration sensor (Sv) is disposed on the opposite side with respect to the working surface of the moldboard (7).

With the presence of the vibration sensor (Sv), in addition to the fundamental force sensor (Ss), the controller (500) compares the values detected by said sensors with the desired ratio $(a/\sigma)_{max}$ between vibration and force, which can be set on the set point of the controller (500).

Numerous variations and modifications can be made to the embodiments of the invention, which are within the reach of an expert of the field, while still falling within the scope of the invention described in the enclosed claims.

The invention claimed is:

1. A plow apparatus comprising:
   a share adapted to cut soil into clods;
   a moldboard connected to said share so as to form a share-moldboard assembly, said moldboard adapted to turn over the clods of soil cut by said share;
   a beam adapted to connect said share-moldboard assembly to a motor vehicle;
   a vibrator assembly connected to said moldboard so as to vibrate said share-moldboard assembly;
   a force sensor connected to the beam so as to detect a plowing force on said beam; and
   a controller connected to said force sensor and to said vibrator assembly so as to control the vibration of said vibrator assembly according to a force value of the plowing force detected by said force sensor, said controller cooperative with said force sensor so as to acquire the force value from said force sensor so as to obtain a minimum force through control of said vibrator assembly.

2. The plow apparatus of claim 1, further comprising:
   a power sensor connected to said vibrator assembly so as to detect a power absorption value from said vibrator assembly, said controller cooperative with said power sensor so as to acquire the power absorption values from said power sensor in order to obtain a maximum desired value of a ratio between the power absorption value and the force value through the control of said vibrator assembly.

3. The plow apparatus of claim 1, further comprising:
   a vibration sensor connected to said share-moldboard assembly so as to detect a vibration absorption value of said share-moldboard assembly, said controller cooperative with said vibration sensor so as to acquire the vibration absorption value from said vibration sensor so as to obtain a maximum desired value of a vibration-force through the control of said vibrator assembly.

4. The plow apparatus of claim 1, said vibrator assembly comprising at least one vibrator having a rotary shaft connected to at least two masses, the control of said vibrator assembly resulting by varying a number of revolutions of said rotary shaft.

5. The plow apparatus of claim 1, said vibrator assembly comprising a vibrator, said vibrator comprising:
   a rotary shaft;
   a first mass joined to said rotary shaft;
   a second mass revolvingly mounted on said rotary shaft, wherein straight lines passing through centers-of-gravity of said first and second masses and an axis of said rotary shaft form an angle that identifies an angular position of said first and second masses;
   a variation device connected to said second mass so as to move said second mass with respect to said first mass so as to vary the angular position of said first and second masses and to block said second mass in position so as to fix the desired angular position, said vibrator assembly being controlled by varying the angular position of said first and second masses by said variation device.

6. The plow apparatus of claim 5, said variation device being a back drive or brushless motor.

7. The plow apparatus of claim 4, the vibrator comprising:
   at least two pairs of masses wherein each of the pairs of masses a first mass is fixed to said rotary shaft and a second mass revolves with respect to said rotary shaft.

8. The plow apparatus of claim 1, said vibrator assembly:
   a pair of vibrators in which each has at least one mass connected to a rotary shaft;
   a pair of motors rotatably drivingly connected respectively to the rotary shafts of said pair of vibrators; and
   an adjustment and control system cooperative with said pair of motors and said pair of vibrators so as to adjust and control a rotational speed of the rotary shafts and a displacement of the masses so as to vary a mutual displacement of the masses and to maintain a rotational speed of the rotary shafts, wherein control of said vibrator assembly is obtained by adjusting and controlling the rotational speeds of the rotary shafts and the mutual displacement of the masses.

9. The plow apparatus of claim 8, said adjustment and control system comprising:
   a pair of encoders connected to said pair of vibrators so as to detect an angular position of said pair of vibrators;
   a pair of power supplies connected to said pair of motors; and
   a control unit connected to said pair of encoders and to said pair of power supplies so as to control the rotational speed of said pair of motors and the mutual displacement of the masses.

10. The plow apparatus of claim 9, said adjustment and control system allowing rotation of the rotary shafts in a same direction so as to obtain an omni-directional vibration or allowing rotation in opposition direction so as to obtain a uni-directional vibration.

\* \* \* \* \*